Oct. 5, 1954 P. DIEBOLD 2,690,813
SEPARATOR FOR DUST CARRYING GASES
Original Filed May 17, 1947

INVENTOR:
PIERRE DIEBOLD
BY:

Patented Oct. 5, 1954

2,690,813

UNITED STATES PATENT OFFICE 2,690,813

SEPARATOR FOR DUST CARRYING GASES

Pierre Diebold, Nancy, France

Original application May 17, 1947, Serial No. 748,832. Divided and this application October 26, 1950, Serial No. 192,250. In France July 12, 1944

Section 1, Public Law 690, August 8, 1946
Patent expires July 12, 1964

6 Claims. (Cl. 183—67)

This is a divisional application divided from my copending application Serial No. 748,832, filed May 17, 1947, now Patent No. 2,622,936.

This invention relates to separators and more especially to apparatus for separating dust and other materials in powder form from air or other mediums in which they are suspended.

It is an object of this invention to provide a simple apparatus in which the solid particles suspended in a gaseous medium can be separated at greater speed and with greater efficiency than by other devices hitherto described.

In the drawings affixed to this specification and forming part thereof several embodiments of a separator according to this invention are illustrated diagrammatically by way of example.

Figure 1:
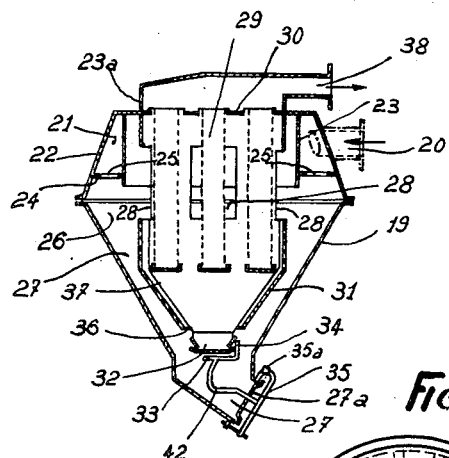
Fig. 1 is a vertical axial section of the first embodiment.

Referring to the drawings and first to Fig. 1, 19 is the lower and 22 the upper part of a biconical cyclone housing. 20 is the intake pipe leading tangentially to the air canal 21 delimited by the inner wall of the top part 22 and a cylindrical partition 23 suspended in this part which latter serves for protecting the filters 29 against the impact of the dust particles entering through the intake pipe. This canal is closed by an annular bottom 24 with perforations 25 through which the dust-laden air enters the space 26 in the cyclone housing where it expands, while the greater part of the solid dust particles, having lost their speed, drop into the collecting space 27. Through the top of the upper part 22 of the cyclone housing extends the cylindrical wall 23a of a filter case which is formed with large apertures 28 and ends at the bottom in a funnel 31 closed by a cover 32 which is supported by a flap 33 hinged to the bottom opening of the funnel at 34 and connected by an arm 42 to the pressure bar 35 which is hinged at 35a to the bottom opening of the cyclone housing and carries a stopper 27a closing this opening. Funnel 31 is double-walled and has its inner wall spaced from and carried by its outer wall through the medium of annularly spaced partitions fixed to and located between the inner and outer walls to form conduits 37. Conduits 37 lead from openings 36 in the outer funnel wall upwardly into the filter compartment containing filters 29. The air escaping through the filters is sucked off through the pipe 38.

The major part of the dust particles accumulates at the bottom of the housing 19 and can be removed by opening the stopper 27a. The dust retained by the filters drops into the funnel 31.

The use of centrifugal forces acting on the air and dust mixture entering the separator through the tangential pipe 20 leaves the central section of the separator free for the central accommodation of the filters.

The double-cone form of the separator shell is important for the reason that the air after having entered into the apparatus, meets a gradually enlarging cross section which helps in the expansion of the air and favors the descent of the dust carried along by the air. In addition to this, the air has lost part of its velocity of flow when meeting the filter bags which therefore are not subject to wear by the impact of dust particles.

The horizontal plane in which meet the two cones of the shell and which contains the largest cross section, passes approximately through the middle of the openings 28 through which the air enters the cylinder 23a.

Figure 2:
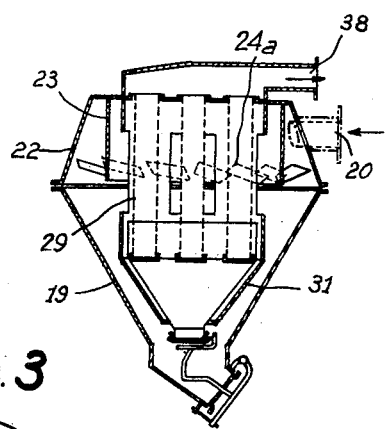
Fig. 2 is a view similar to Fig. 1 of a modified form.
Figure 3:
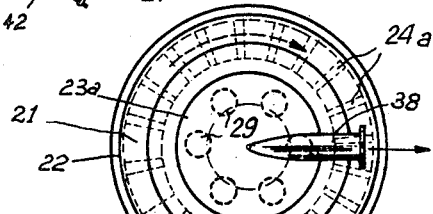
Fig. 3 is a top plan view of the structure of Fig. 2.

In the modified form illustrated in Figs. 2 and 3 the bottom 24 of Fig. 1 is replaced by a circle of vanes 24a fixed in inclined, substantially horizontal position between the inner wall of the part 22 and the cylindrical inset 23.

These vanes 24a are inclined after the manner of turbine vanes and serve for guiding the air currents and for furthering the separation of dust particles by preserving the whirling motion of the air and reducing turbulence.

In consequence of these arrangements this form of the separator operates as follows: the air currents laden with dust enter the cyclone in a horizontal plane and the dust particles are projected outwardly by centrifugal action since the air is compelled to rotate around the cyclone axis.

The dust particles are thus subjected to a centrifugal action and to the action of gravity and are not hindered in their motions by any obstacles which might oppose their free movement thanks to the conical form of the top part 22 of the separator. They can descend freely thanks to the vanes which guide them, the heavier particles taking the path across the free spaces between adjoining vanes which are larger at the circumference of the circle than near the center. The widened spaces favor the descent of the dust particles which collect in the bottom center of the separator owing to the conical inset 31.

Since the larger dust particles are projected outwardly on entering the apparatus, they are not carried along by the air when it enters the filters 29.

Figure 4:
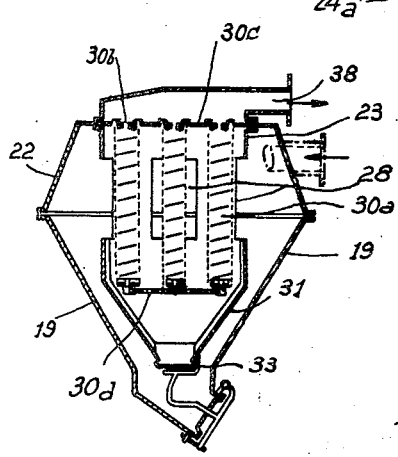
Fig. 4 illustrates the third embodiment.

Fig. 4 illustrates the provision, in a cyclone of the kind described, of tubular filters 30a extending between the borders of openings 30b in the horizontal partition 30c and brackets 30d extending horizontally across the funnel 31.

Figure 5:
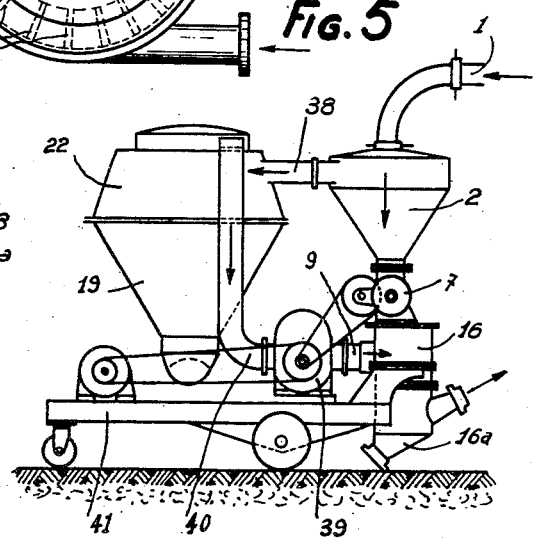
Fig. 5 is an elevation of a grain ventilating apparatus.

In Fig. 5 is shown a separator of the kind above described in combination with a receiver 2 for granular goods such as grain which is fed by the hose 1 to a receiver 2 from which it passes to the receiver 7. A fan 39 forces purified air through the pipe 9 into the chamber 16 and projects the grain into the impulse conveyer 16a which can be adjusted for every direction similarly as the hose 1. The air laden with dust is sucked by the fan 39 through pipe 38 into the receiver 2 and the filtered air sucked through 40 is forced back into the tube chamber 16 and conveyor 16a, as aforesaid. The combination shown in Figure 5 is more fully described in Patent 2,622,936.

I wish it to be understood that I do not desire to be limited to the details of construction shown and described, for obvious modifications will occur to a person skilled in the art.

I claim:

1. Separating apparatus for separating, from a gas, particles suspended therein, comprising, in combination, a lower conical housing portion having an upper end larger than a lower end thereof; an upper conical housing portion having a lower end larger than an upper end thereof, of the same size as said upper end of said lower housing portion and being joined thereto, said upper housing portion being formed with an opening between said ends thereof; inlet conduit means joined to said opening and extending tangentially to said upper housing portion for tangentially admitting gas to be purified into the space included by said housing portions; a cylindrical enclosure connected to said upper housing portion on the interior and centrally thereof and extending into said lower housing portion, said enclosure being formed with at least one opening extending above and below said lower end of said upper housing portion; a cylindrical guide member of a larger diameter than said cylindrical enclosure located concentrically about the latter, being fixed to said upper end of said upper housing portion and having a lower edge portion at least partially overlapping said opening of said cylindrical enclosure; and filter means mounted within said enclosure for filtering gas admitted to the same.

2. Separating apparatus for separating, from a gas, particles suspended therein, comprising, in combination, a lower conical housing portion having an upper end larger than a lower end thereof; an upper conical housing portion having a lower end larger than an upper end thereof, of the same size as said upper end of said lower housing portion and being joined thereto, said upper housing portion being formed with an opening between said ends thereof; inlet conduit means joined to said opening and extending tangentially to said upper housing portion for tangentially admitting gas to be purified into the space included by said housing portions; a cylindrical enclosure connected to said upper housing portion on the interior and centrally thereof and extending into said lower housing portion, said enclosure being formed with at least one opening extending above and below said lower end of said upper housing portion; a cylindrical guide member of a larger diameter than said cylindrical enclosure located concentrically about the latter, being fixed to said upper end of said upper housing portion and having a lower edge portion at least partially overlapping said opening of said cylindrical enclosure; vane means mounted on said lower edge portion of said guide member above said lower end of said upper housing portion, below said opening in said upper housing portion and between the latter and said guide member; and filter means mounted within said enclosure for filtering gas admitted to the same.

3. Separating apparatus for separating, from a gas, particles suspended therein, comprising, in combination, a lower conical housing portion having an upper end larger than a lower end thereof; an upper conical housing portion having a lower end larger than an upper end thereof, of the same size as said upper end of said lower housing portion and being joined thereto, said upper housing portion being formed with an opening between said ends thereof; inlet conduit means joined to said opening and extending tangentially to said upper housing portion for tangentially admitting gas to be purified into the space included by said housing portions; a cylindrical enclosure connected to said upper housing portion on the interior and centrally thereof and extending into said lower housing portion, said enclosure being formed with at least one opening extending above and below said lower end of said upper housing portion; a cylindrical guide member of a larger diameter than said cylindrical enclosure located concentrically about the latter, being fixed to said upper end of said upper housing portion and having a lower edge portion at least partially overlapping said opening of said cylindrical enclosure; vane means mounted on said lower edge portion of said guide member above said lower end of said upper housing portion, below said opening in said upper housing portion and between the latter and said guide member, said vane means comprising a plurality of blade members evenly distributed about said guide member, and each having one end fixed to said lower edge portion of said guide member and an opposite free end spaced from said upper housing portion; and filter means mounted within said enclosure for filtering gas admitted to the same.

4. Separating apparatus for separating, from a gas, particles suspended therein, comprising, in combination, a lower conical housing portion having an upper end larger than a lower end thereof; an upper conical housing portion having a lower end larger than an upper end thereof, of the same size as said upper end of said lower housing portion and being joined thereto, said upper housing portion being formed with an opening between said ends thereof; inlet conduit means joined to said opening and extending tangentially to said upper housing portion for tangentially admitting gas to be purified into the space included by said housing portions; a cylindrical enclosure connected to said upper housing portion on the interior and centrally thereof and extending into said lower housing portion, said enclosure being formed with at least one opening extending above and below said lower end of said upper housing portion; a cylindrical guide member of a larger diameter than said cylindrical enclosure located concentrically about the latter, being fixed to said upper end of said upper housing portion and having a lower edge portion at least partially overlapping said opening of said cylindrical enclosure; vane means mounted on said lower edge portion of said guide member above said lower end of said upper housing portion, below said opening in said upper housing portion and between the latter and said guide member, said vane means comprising a plurality of blade members evenly distributed about and extending radially from said guide member, and each having one end fixed to said lower edge portion of said guide member and an opposite free end spaced from said upper housing portion, each blade member being almost parallel to a plane in which said lower end of said upper housing portion is located; and filter means mounted within said enclosure for filtering gas admitted to the same.

5. Separating apparatus for separating, from a gas, particles suspended therein, comprising, in combination, a lower conical housing portion having an upper end larger than a lower end thereof; an upper conical housing portion having a lower end larger than an upper end thereof, of the same size as said upper end of said lower housing portion and being joined thereto, said upper housing portion being formed with an opening between said ends thereof; inlet conduit means joined to said opening and extending tangentially to said upper housing portion for tangentially admitting gas to be purified into the space included by said housing portions; a cylindrical enclosure connected to said upper housing portion on the interior and centrally thereof and extending into said lower housing portion, said enclosure being formed with at least one opening extending above and below said lower end of said upper housing portion; a conical extension of the same inclination as said lower housing portion located within the latter and being connected to a lower edge of said cylindrical enclosure; and filter means mounted within said enclosure for filtering gas admitted to the same.

6. Separating apparatus for separating, from a gas, particles suspended therein, comprising, in combination, a lower conical housing portion having an upper end larger than a lower end thereof; an upper conical housing portion having a lower end larger than an upper end thereof, of the same size as said upper end of said lower housing portion and being joined thereto, said upper housing portion being formed with an opening between said ends thereof; inlet conduit means joined to said opening and extending tangentially to said upper housing portion for tangentially admitting gas to be purified into the space included by said housing portions; a cylindrical enclosure connected to said upper housing portion on the interior and centrally thereof and extending into said lower housing portion, said enclosure being formed with at least one opening extending above and below said lower end of said upper housing portion; a conical extension of the same inclination as said lower housing portion located within the latter and being connected to a lower edge of said cylindrical enclosure; a pair of movable closure members respectively mounted on a lower end of said conical extension and said lower end of said lower housing portion for movement between open and closed positions; a single actuating member connected to said pair of closure members for simultaneously moving the same between said positions; and filter means mounted within said enclosure for filtering gas admitted to the same.

References Cited in the file of this patent

UNITED STATES PATENTS

| Number | Name | Date |
|---|---|---|
| 772,689 | Allington | Oct. 18, 1904 |
| 841,984 | Kenney | Jan. 22, 1907 |
| 992,531 | Allington | Mar. 31, 1911 |
| 1,717,369 | Clements | June 18, 1929 |
| 1,756,909 | Cram | Apr. 29, 1930 |
| 1,841,556 | Stelz | Jan. 19, 1932 |

FOREIGN PATENTS

| Number | Country | Date |
|---|---|---|
| 184,600 | Germany | May 2, 1907 |
| 614,016 | Germany | May 31, 1935 |